United States Patent
Yuan

(10) Patent No.: US 10,788,903 B2
(45) Date of Patent: Sep. 29, 2020

(54) SIGNAL GENERATING CIRCUIT OF ACTIVE PEN, ACTIVE PEN AND SIGNAL DRIVING METHOD

(71) Applicant: SHENZHEN GOODIX TECHNOLOGY CO., LTD., Shenzhen (CN)

(72) Inventor: Guangkai Yuan, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/179,919

(22) Filed: Nov. 3, 2018

(65) Prior Publication Data

US 2019/0179435 A1 Jun. 13, 2019

Related U.S. Application Data

(63) Continuation of application No. PCT/CN2017/115860, filed on Dec. 13, 2017.

(51) Int. Cl.
*G06F 3/0354* (2013.01)
*G06F 3/038* (2013.01)
*G06F 3/044* (2006.01)
*G06F 3/041* (2006.01)
*G06F 1/3234* (2019.01)

(52) U.S. Cl.
CPC .......... *G06F 3/03545* (2013.01); *G06F 1/325* (2013.01); *G06F 3/0383* (2013.01); *G06F 3/044* (2013.01); *G06F 3/0412* (2013.01); *G06F 3/0442* (2019.05)

(58) Field of Classification Search
USPC ......................................................... 345/179
See application file for complete search history.

(56) References Cited

U.S. PATENT DOCUMENTS

| | | | | |
|---|---|---|---|---|
| 2004/0263124 A1* | 12/2004 | Wieck | ................... | G06F 1/263 |
| | | | | 320/128 |
| 2011/0320165 A1 | 12/2011 | Miyamoto et al. | | |
| 2015/0309598 A1* | 10/2015 | Zeliff | ..................... | G06F 3/044 |
| | | | | 345/179 |

FOREIGN PATENT DOCUMENTS

| | | |
|---|---|---|
| CN | 201741118 U | 2/2011 |
| CN | 202486732 U | 10/2012 |
| CN | 103425296 A | 12/2013 |
| CN | 104216538 A | 12/2014 |
| CN | 204423321 U | 6/2015 |
| CN | 105739751 A | 7/2016 |
| CN | 107111389 A | 8/2017 |

(Continued)

*Primary Examiner* — Amr A Awad
*Assistant Examiner* — Jonathan G Cooper

(57) ABSTRACT

A signal generating circuit of an active pen (300), an active pen and a signal driving method are disclosed. The signal generating circuit includes a power source unit (310) and a control unit (320), the power source unit (310) is configured to supply a signal driving voltage to the active pen, and the control unit (320) is configured to control alternate generation of a positive voltage and a negative voltage between a pen tip and a pen casing of the active pen in case where the power source unit only generates a single voltage. The signal generating circuit (300), the active pen and the signal driving method can reduce a signal driving power consumption of the active pen while ensuring a signal driving effect.

14 Claims, 9 Drawing Sheets

(56) References Cited

FOREIGN PATENT DOCUMENTS

| CN | 107438941 A | 12/2017 |
| CN | 107463279 A | 12/2017 |

* cited by examiner

000# SIGNAL GENERATING CIRCUIT OF ACTIVE PEN, ACTIVE PEN AND SIGNAL DRIVING METHOD

CROSS REFERENCE TO RELATED APPLICATIONS

The present disclosure is a continuation of international application No. PCT/CN2017/115860 filed on Dec. 13, 2017, of which is hereby incorporated by reference in its entirety.

TECHNICAL FIELD

The present application relates to the field of touch-control technology, and in particular, to a signal generating circuit of an active pen, an active pen, and a signal driving method.

BACKGROUND

With the development of touch-control technology and mobile terminal technology, more and more mobile terminals use a touch-control manner for a human-computer interaction. At present, touch screens used in mobile terminals mainly include capacitive touch screens and resistive touch screens, among which the capacitive touch screens have been favored by more and more users with its good definition, light transmittance and tactility.

A touch operation can be performed on the capacitive touch screen directly by a finger, and the touch operation can also be performed on the capacitive touch screen by using an active stylus writing pen (hereinafter referred to as an active pen) instead of the finger. At present, when the signal driving communication is realized between the active pen and a terminal device, a pen casing of the active pen is connected to a system ground and a pen tip of the active pen directly receives a driven signal. However, in the solution of the prior art, under a certain signal driving effect, a signal driving power consumption of the active pen is relatively large.

SUMMARY

In view of this, embodiments of the present application provide a signal generating circuit of an active pen, an active pen, and a signal driving method, which can reduce the signal driving power consumption of the active pen while ensuring the signal driving effect.

In a first aspect, a signal generating circuit of an active pen is provided, where the signal generating circuit includes a power source unit and a control unit, the power source unit is configured to supply a signal driving voltage to the active pen, and the control unit is configured to control alternate generation of a positive voltage and a negative voltage between a pen tip and a pen casing of the active pen in case where the power source unit only generates a single voltage.

Optionally, the signal driving voltage supplied by the power source unit can be a direct current voltage or an alternating current voltage, such as a sine wave.

In a possible design, the control unit includes a first switch group and a second switch group; the power source unit is connected to the active pen through the first switch group and the second switch group, respectively; and a positive voltage and a negative voltage are alternately generated between the pen tip and the pen casing when the first switch group and the second switch group are alternately closed.

In a possible design, the first switch group includes a first switch and a fourth switch; the second switch group includes a second switch and a third switch; a positive electrode of the power source unit is connected to the pen tip through the first switch; the positive electrode of the power source unit is connected to the pen casing through the second switch; a negative electrode of the power source unit is connected to the pen tip through the third switch; and the negative electrode of the power source unit is connected to the pen casing through the fourth switch.

In a possible design, the signal generating circuit includes a boosting unit, wherein the boosting unit is configured to, by a control of the control unit, enable the positive voltage or the negative voltage generated between the pen tip and the pen casing to be greater than a voltage supplied by the power source unit.

By introducing the boosting unit, under the control of the control unit, the power source unit is only required to supply a lower voltage, a relatively high positive voltage or negative voltage can be obtained between the pen tip and the pen casing, thereby acquiring larger voltage differences of the positive voltage and the negative voltage and obtaining a better signal driving effect.

In a possible design, the boosting unit includes an inductance group and a diode group; in a charging phase, the power source unit charges the inductance group under the control of the control unit; in a discharging phase, under the control of the control unit, an energy of the inductance group charged in the charging phase is transferred to a capacitor between the pen tip and the pen casing; and the diode group is configured to maintain a voltage of the capacitor charged in the discharging phase.

In a possible design, the inductance group includes a first inductance; the control unit includes a first switch, a second switch, a third switch and a fourth switch; the charging phase is divided into a first phase and a third phase; and the discharging phase is divided into a second phase and a fourth phase; in the first phase, the first switch and the third switch are closed, and the power source unit charges the first inductance; in the second phase, the first switch and the fourth switch are closed, the second switch and the third switch are open, and an energy of the first inductance stored in the first phase is transferred to the capacitor between the pen tip and the pen casing; in the third phase, the second switch and the fourth switch are closed, and the power source unit charges the first inductance; and in the fourth phase, the first switch and the fourth switch are open, the second switch and the third switch are closed, and an energy of the first inductance stored in the third phase is transferred to the capacitor between the pen tip and the pen casing.

In a possible design, the diode group includes a first diode; one end of the first inductance is connected to a positive electrode of the power source unit, and the other end of the first inductance is connected to an anode of the first diode; a cathode of the first diode is connected to the pen tip through the first switch; the cathode of the first diode is connected to the pen casing through the second switch; a negative electrode of the power source unit is connected to the pen tip and the first switch respectively through the third switch; and the negative electrode of the power source unit is connected to the pen casing and the second switch respectively through the fourth switch.

In a possible design, the diode group includes a first diode and a second diode; one end of the first inductance is connected to a positive electrode of the power source unit; the other end of the first inductance is connected to an anode of the first diode through the first switch; the other end of the first inductance is connected to an anode of the second diode through the second switch; a negative electrode of the power source unit is connected to the pen tip and a cathode of the first diode respectively through the third switch; and the negative electrode of the power source unit is connected to the pen casing and a cathode of the second diode respectively through the fourth switch.

In a possible design, the inductance group includes a first inductance and a second inductance; the diode group includes a first diode and a second diode; the first inductance is connected in series with the first diode; the second inductance is connected in series with the second diode; the control unit includes a first switch, a second switch, a third switch and a fourth switch; the charging phase is divided into a first phase and a third phase; and the discharging phase is divided into a second phase and a fourth phase; in the first phase, the first switch and the third switch are closed, and the power source unit charges the first inductance; in the second phase, the first switch and the fourth switch are closed, the third switch is open, and an energy of the first inductance stored in the first phase is transferred to the capacitor between the pen tip and the pen casing; in the third phase, the second switch and the fourth switch are closed, and the power source unit charges the second inductance; and in the fourth phase, the fourth switch is open, the second switch and the third switch are closed, and an energy of the second inductance stored in the third phase is transferred to the capacitor between the pen tip and the pen casing.

In a possible design, both one end of the first inductance and one end of the second inductance are connected to a positive electrode of the power source unit; the other end of the first inductance is connected to an anode of the first diode through the first switch; the other end of the second inductance is connected to an anode of the second diode through the second switch; a negative electrode of the power source unit is connected to the pen tip and a cathode of the first diode respectively through the third switch; and the negative electrode of the power source unit is connected to the pen casing and a cathode of the second diode respectively through the fourth switch.

In a possible design, a positive electrode of the power source unit is connected to one end of the first inductance through the first switch; the positive electrode of the power source unit is connected to one end of the second inductance through the second switch; the other end of the first inductance is connected to an anode of the first diode; the other end of the second inductance is connected to an anode of the second diode; a negative electrode of the power source unit is connected to a cathode of the first diode and the pen tip respectively through the third switch; and the negative electrode of the power source unit is connected to a cathode of the second diode and the pen casing respectively through the fourth switch.

In a possible design, the inductance group includes a first inductance and a second inductance; the diode group includes a first diode and a second diode; the control unit includes a third switch and a fourth switch; a positive electrode of the power source unit is connected to one end of the first inductance; the positive electrode of the power source is connected to one end of the second inductance; the other end of the first inductance is connected to an anode of the first diode; the other end of the second inductance is connected to an anode of the second diode; a negative electrode of the power source unit is connected to a cathode of the first diode and the pen tip respectively through the third switch; the negative electrode of the power source unit is connected to a cathode of the second diode and the pen casing respectively through the fourth switch; the charging phase includes a first phase and a third phase; and the discharging phase includes a second phase and a fourth phase; in the first phase, the third switch is closed, the fourth switch is open, and the power source unit charges the first inductance; in the second phase, the third switch is open, the fourth switch is closed, and an energy of the first inductance charged in the first phase is transferred to the capacitor between the pen tip and the pen casing; in the third phase, the third switch is open, the fourth switch is closed, and the power source unit charges the second inductance; and in the fourth phase, the third switch is closed, the fourth switch is open, and an energy of the second inductance charged in the third phase is transferred to the capacitor between the pen tip and the pen casing.

In a possible design, the control unit further includes a fifth switch and a sixth switch; the fifth switch is connected in parallel with the third switch and the first diode; the sixth switch is connected in parallel with the fourth switch and the second diode; the fifth switch and the third switch are open or closed simultaneously; and the sixth switch and the fourth switch are open or closed simultaneously.

In a possible design, the first switch and the second switch are PMOS tubes, and the third switch and the fourth switch are NMOS tubes.

In a second aspect, an active pen is provided, where the active pen includes the signal generating circuit of the first aspect or any one optional implementation of the first aspect.

In a third aspect, a signal driving method is provided, where the signal driving method is configured for the communication between an active pen and a terminal device; a signal generating circuit of the active pen is configured to perform the signal driving method; the signal generating circuit includes a power source unit and a control unit; the power source unit is connected to a pen tip and a pen casing of the active pen through the control unit; and in case where the power source unit only generates a single voltage, the method includes: controlling, by the control unit, alternate generation of a positive voltage and a negative voltage between the pen tip and the pen casing.

In a possible design, the control unit includes a first switch, a second switch, a third switch and a further switch; a positive electrode of the power source unit is connected to the pen tip through the first switch; the positive electrode of the power source unit is connected to the pen casing through the second switch; a negative electrode of the power source unit is connected to the pen tip through the third switch; and the negative electrode of the power source unit is connected to the pen casing through the fourth switch; the controlling, by the control unit, the alternate generation of the positive voltage and the negative voltage between the pen tip and the pen casing of the active pen includes: in a first phase, by controlling the first switch and the fourth switch in a closed state and controlling the second switch and the third switch in an open state, charging a capacitor between the pen tip and the pen casing; and in a second phase, by controlling the first switch and the fourth switch in an open state and controlling the second switch and the third switch in a closed state, charging the capacitor between the pen tip and the pen casing, where a direction of charging the capacitor in the first phase is opposite to a direction of charging the capacitor in the second phase.

In a possible design, the signal generating circuit further includes a first inductance, a second inductance, a first diode and a second diode; a first switch group includes a first switch and a fourth switch, a second switch group includes a second switch and a third switch; both one end of the first inductance and one end of the second inductance are connected to a positive electrode of the power source unit; the other end of the first inductance is connected to an anode of the first diode through the first switch; the other end of the second inductance is connected to an anode of the second diode through the second switch; a negative electrode of the power source unit is connected to the pen tip and a cathode of the first diode respectively through the third switch; the negative electrode of the power source unit is connected to the pen casing and a cathode of the second diode respectively through the fourth switch; and the controlling, by the control unit, the alternate generation of the positive voltage and the negative voltage between the pen tip and the pen casing of the active pen includes: in a first phase, by controlling the first switch and the third switch in a closed state, charging the first inductance; in a second phase, by controlling the first switch and the fourth switch in a closed state and controlling the third switch in an open state, transferring an energy of the first inductance stored in the first phase to a capacitor between the pen tip and the pen casing; in a third phase, by controlling the second switch and the fourth switch in a closed state, charging the second inductance; and in a fourth phase, by controlling the fourth switch in an open state and controlling the second switch and the third switch in a closed state, transferring an energy of the second inductance stored in the third phase to the capacitor between the pen tip and the pen casing.

In a possible design, the signal generating circuit further includes a first inductance, a second inductance, a first diode and a second diode; a first switch group includes a fourth switch; a second switch group includes a third switch; a positive electrode of the power source unit is connected to one end of the first inductance; the positive electrode of the power source unit is connected to one end of the second inductance; the other end of the first inductance is connected to an anode of the first diode; the other end of the second inductance is connected to an anode of the second diode; a negative electrode of the power source unit is connected to a cathode of the first diode and the pen tip respectively through the third switch; the negative electrode of the power source unit is connected to a cathode of the second diode and the pen casing respectively through the fourth switch; and the controlling, by the control unit, the alternate generation of the positive voltage and the negative voltage between the pen tip and the pen casing of the active pen includes: in a first phase, by controlling the third switch in a closed state and controlling the fourth switch in an open state, charging the first inductance and transferring an energy of the second inductance charged in a second phase to a capacitor between the pen tip and the pen casing; and in the second phase, by controlling the third switch in an open state and controlling the fourth switch in a closed state, charging the second inductance and transferring an energy of the first inductance charged in the first phase to the capacitor between the pen tip and the pen casing.

Based on the aforesaid technical solutions, in case where the power source unit only generates a single voltage, by a control of the control unit, a positive voltage and a negative voltage are alternately generated between the pen tip and the pen casing of the active pen, so as to reduce the signal driving power consumption of the active pen while ensuring the signal driving effect.

These and other aspects of the present application will be more readily apparent in the following description of the embodiments.

DESCRIPTION OF EMBODIMENTS

In order to make those skilled in the art better understand the technical solutions in the embodiments of the present application, a clear and complete description of the technical solutions in the embodiments of the present application will be given below, in combination with the accompanying drawings in the embodiments of the present application. Apparently, the embodiments described below are merely a part, but not all, of the embodiments of the present application, based on which all of other embodiments obtained by those skilled in the art fall into the protection scope of the embodiments of the present application.

Figure 1:
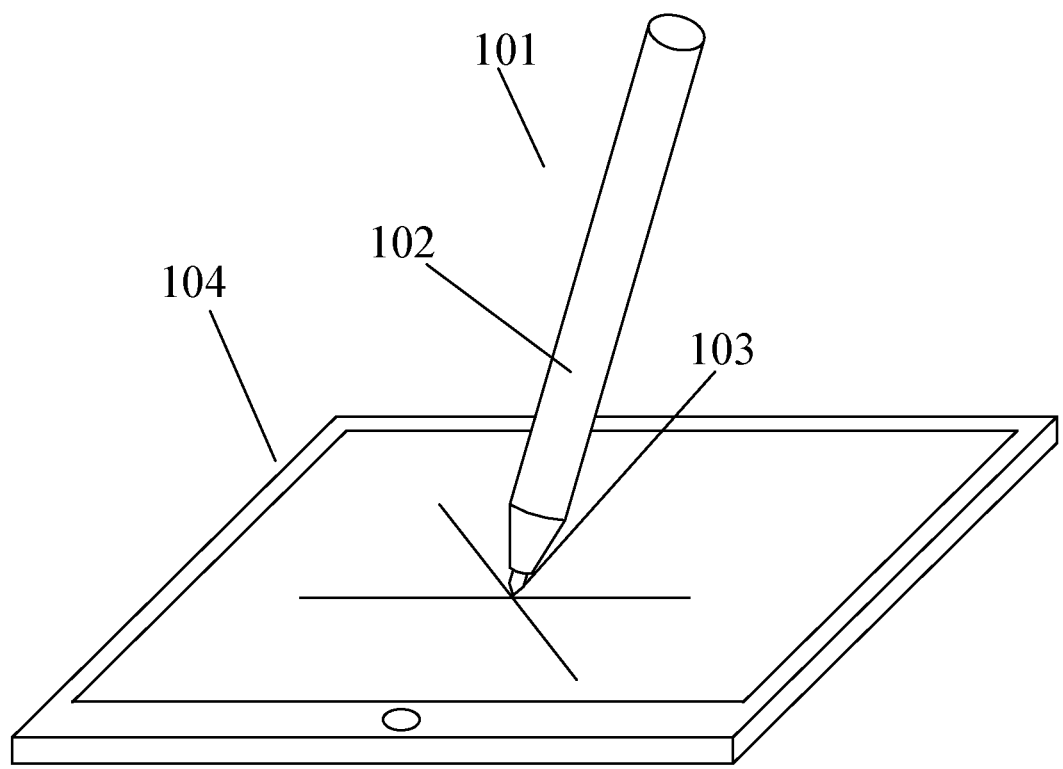
FIG. 1 shows a diagram of an application scenario in which an active pen is used cooperatively with a terminal device of an embodiment of the present application.

FIG. 1 is a diagram of an application scenario in which a currently common active pen 101 is used cooperatively with a terminal device 104 having a touch screen. The active pen 101 is used to write or input an instruction to the terminal device 104, such as a computer screen, a mobile device, a drawing board, etc., to implement a human-computer interaction. As shown in FIG. 1, the active pen 101 includes a pen casing 103 and a pen tip 102. In order to realize the communication between the active pen 101 and the terminal device 104, the pen tip needs to output a signal driving signal.

Figure 2:
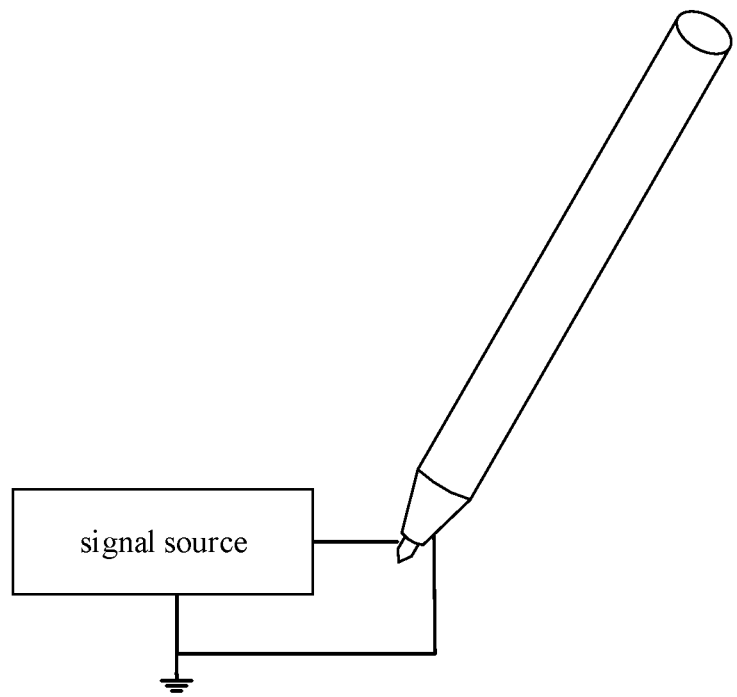
FIG. 2 shows a schematic diagram in which an active pen codes through a signal source when the active pen communicates with a terminal device.
Figure 3:
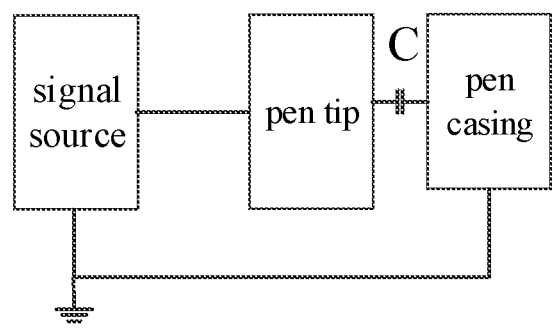
FIG. 3 shows an equivalent circuit diagram when an active pen performs signal driving.

When the signal driving communication is realized by the active pen, the pen casing of the active pen is usually connected to a system ground, and a signal driving signal supplied by a signal source is directly added to the pen tip of the active pen. FIG. 2 shows a schematic diagram in which an active pen codes through a signal source when the active pen communicates with a terminal device. In order to improve a signal-to-noise ratio of a communication signal between the active pen and the terminal device, a signal driving signal on the pen tip is usually a high voltage signal. FIG. 3 is an equivalent schematic diagram as FIG. 2, where a capacitor C is the sum of a parasitic capacitor and other capacitors between the pen tip and the pen casing.

Figure 4:
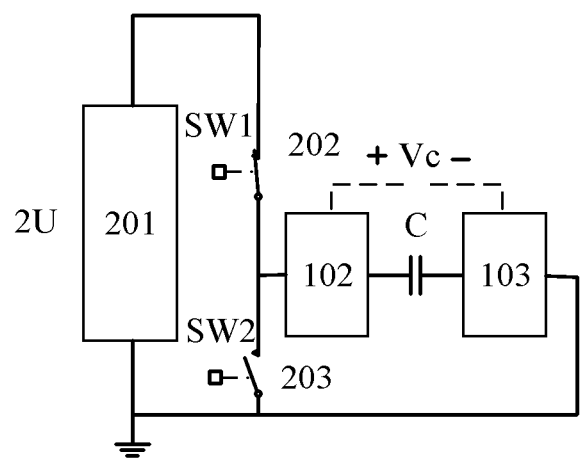
FIG. 4 shows a circuit configuration diagram of a conventional signal generating circuit.
Figure 5:
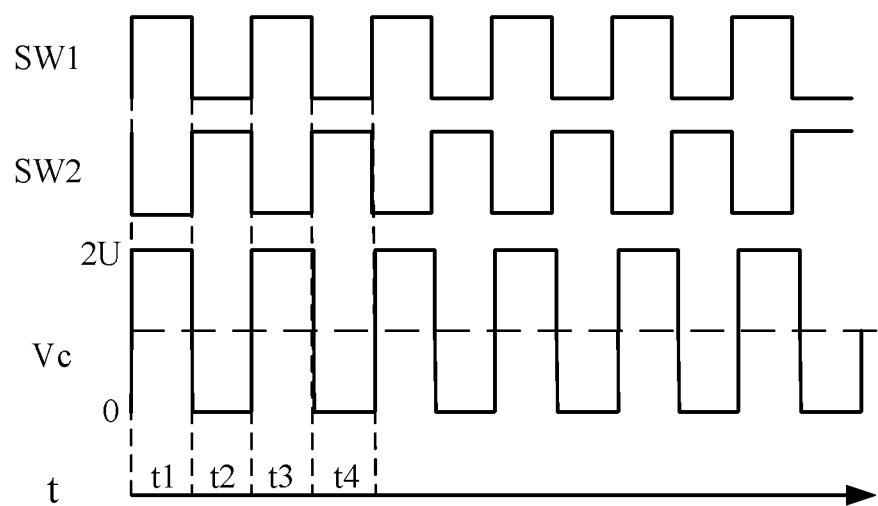
FIG. 5 shows an operation waveform diagram of a conventional signal generating circuit.

FIG. 4 is a structural schematic diagram of a signal generating circuit in the prior art. As shown in FIG. 4, the signal generating circuit includes a signal source 201, a first switch 202 and a second switch 203; a positive electrode of the signal source 201 is connected to the pen tip 102 of the active pen through the switch 202, and a negative electrode of the signal source 201 (system ground) is connected to the pen tip 102 of the active pen through the switch 203 and directly connected to the pen casing 103. A first control signal SW1 is configured to control the first switch 202, and a second control signal SW2 is configured to control the second switch 203; when the first switch 202 and the switch 203 are sequentially controlled by the first control signal SW1 and the second control signal SW2 as shown in FIG. 5, a positive voltage and a negative voltage Vc are alternately generated on a capacitor C between the pen tip and the pen casing. It should be understood that the positive voltage and the negative voltage herein are relative but not absolute; if a voltage of the capacitor C in a charging phase is stipulated as a positive voltage, a voltage of the capacitor C in a discharging phase is a negative voltage. The timing sequence of Vc in an ideal state is shown in FIG. 5. If a voltage generated by the signal source 201 is a direct current voltage 2 U, a positive voltage of Vc is 2 U, and a negative voltage of Vc is 0V. As shown in FIG. 5, in a t1 phase, the first control signal SW1 is at a high level, and the second control signal SW2 is at a low level; in other words, the first switch 202 is closed, the second switch 203 is open, the signal source 201 charges the capacitor C, and a voltage from the pen tip to the pen casing is an output voltage 2 U of the signal source. In a t2 phase, the first control signal SW1 is at a low level, and the second control signal SW2 is at a high level; in other words, the first switch 202 is open, the second switch 203 is closed, the capacitor C is discharged, and a voltage from the pen tip to the pen casing is zero.

Figure 6:
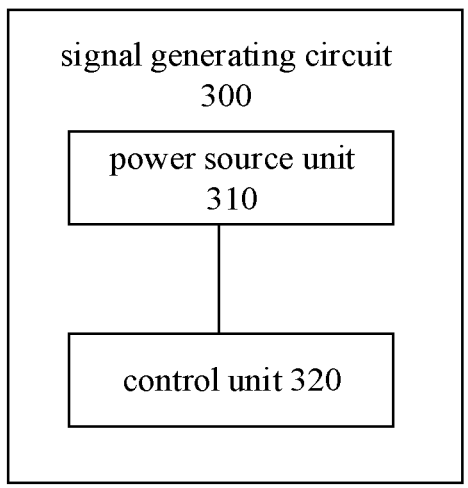
FIG. 6 shows a schematic block diagram of a signal generating circuit of an embodiment of the present disclosure.

FIG. 6 is a schematic block diagram of a signal generating circuit 300 of an embodiment of the present application. As shown in FIG. 6, the signal generating circuit 300 includes a power source unit 310 and a control unit 320. The power source unit 310 is configured to supply a signal driving voltage to an active pen, and the control unit 320 is configured to control alternate generation of a positive voltage and a negative voltage between a pen tip and a pen casing of the active pen in case where the power source unit 310 only generates a single voltage.

It should be understood that the positive and negative voltages in the embodiment of the present application are relative, and are for a direction of charging a capacitor C between the pen tip and the pen casing. It is assumed that a voltage generated by one direction of charging the capacitor C is a positive voltage, a voltage generated by the other direction of charging the capacitor C is naturally a negative voltage. The following embodiments will be described by taking a case where a voltage generated by a charging direction from the pen tip to the pen casing is a positive voltage, and a voltage generated by a charging direction from the pen casing to the pen tip is a negative voltage as an example.

It should also be understood that the solutions of the embodiments of the present application are implemented when the power source unit only generates a single voltage, that is when the power source unit only generates a positive voltage or a negative voltage, which does not mean that the power source unit can only generate a positive voltage or a negative voltage; a scenario but not a capability is emphasized. Moreover, a negative electrode of the power source unit is normally connected to a system ground; however, the embodiments of the present application are not limited thereto as long as a voltage difference between a positive electrode of the power source unit and a negative electrode of the power source unit is a positive voltage or a negative voltage. The power source unit in the embodiments of the present application is also a signal source, and a voltage supplied by the signal source can be a direct current voltage or an alternating current voltage, such as a sine wave voltage, a sawtooth wave voltage and the like. The following embodiments are described by taking the direct current voltage as an example.

A signal generating circuit of the present application will be described in detail below in combination with the specific embodiments.

Figure 7:
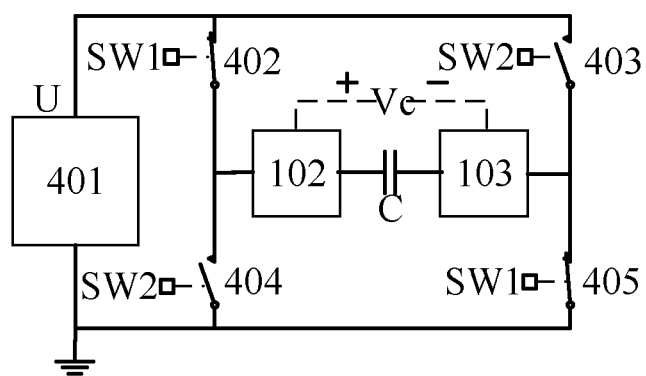
FIG. 7 shows a circuit configuration diagram of a signal generating circuit of an embodiment of the present application.
Figure 8:
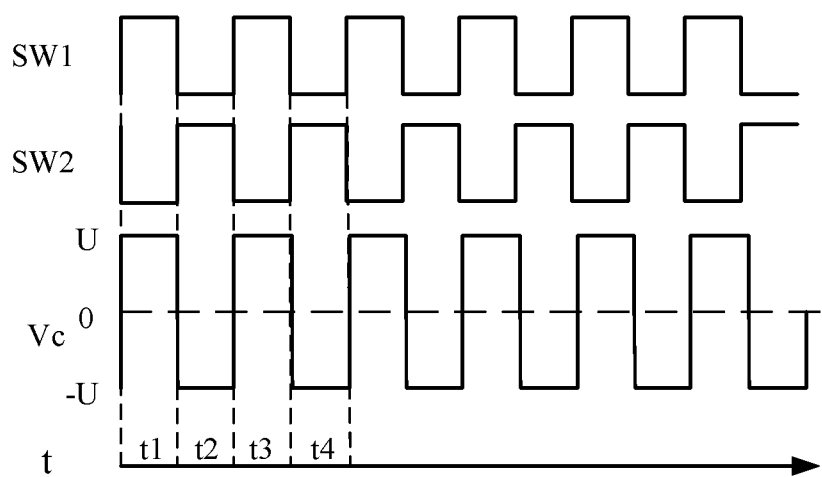
FIG. 8 shows an operation waveform diagram of a signal generating circuit of an embodiment of the present application.

FIG. 7 is a circuit schematic diagram of a signal generating circuit of an embodiment of the present application. As shown in FIG. 7, the signal generating circuit includes a signal source 401, a first switch 402, a second switch 403, a third switch 404, and a fourth switch 405. An output voltage of the signal source 401 is U; a positive electrode of the signal source 401 is connected to a pen tip 102 through the first switch 402; the positive electrode of the signal source 401 is connected to a pen casing 103 through the second switch 403; a negative electrode of the signal source 401 is connected to the pen tip 102 through the third switch 404; and the negative electrode of the signal source 401 is connected to the pen casing 103 through the fourth switch 405. The first switch 402 and the fourth switch 405 can serve as a first switch group, and the second switch 403 and the third switch 404 can serve as a second switch group. The first switch group is controlled by a first control signal SW1, and the second switch group is controlled by a second control signal SW2; in other words, the first switch 402 and the fourth switch 405 are simultaneously closed or simultaneously open, and the second switch 403 and the third switch 404 are simultaneously closed or simultaneously open. As shown in FIG. 8, the states of the first control signal SW1 and the second control signal SW2 are mainly divided into two phases, where a first phase is that the first control signal SW1 is at a high level, and the second control signal SW2 is at a low level; and a second phase is that the first control signal SW1 is at a low level, and the second control signal SW2 is at a high level. Specifically, in a t1 phase, the first control signal SW1 is at a high level, and the second control signal SW2 is at a low level; in other words, the first switch 402 and the fourth switch 405 are closed, the second switch 403 and the third switch 404 are open, the signal source 401 charges a capacitor C between the pen tip 102 and the pen casing 103, and a voltage from the pen tip to the pen casing is an output voltage U of the signal source. In a t2 phase, the first control signal SW1 is at a low level, and the second control signal SW2 is at a high level; in other words, the first switch 402 and the fourth switch 405 are open, the second switch 403 and the third switch 404 are closed, the signal source 401 charges the capacitor C between the pen tip 102 and the pen casing 103 in an opposite direction as the t1 phase, and a voltage Vc from the pen tip to the pen casing is −U. It should be understood that FIG. 8 shows a timing diagram in an ideal state. In an actual circuit, a value of a charging voltage Vc of the capacitor C in the t1 phase and a value of a charging voltage Vc of the capacitor C in the t2 phase may be affected by a power consumption of the circuit, thus they may be different, may not reach the output voltage of the signal source, or may be slightly higher than the output voltage of the signal source.

Comparing the circuit configuration diagram of the embodiment of the present application shown in FIG. 7 with the circuit configuration diagram shown in FIG. 4, under a same signal driving effect, that is in case where voltage differences of peak-to-peak values between the positive voltage and the negative voltage generated between the pen tip and the pen casing are equal, a direct current voltage which the signal source needs to output in FIG. 4 is twice greater than that in FIG. 7. If the direct current voltage output from the signal source in FIG. 7 is U, the direct current voltage which the signal source needs to output in FIG. 4 is 2 U, so as to ensure that the voltage differences of the peak-to-peak values between the positive voltage and the negative voltage are equal, that is, both are 2 U. If it is calculated in one cycle (in the figures, t1 and t2 are one cycle) of the timing diagrams shown in FIG. 5 and FIG. 8:

a signal driving power consumption of the circuit in FIG. 4 is $P1=0.5*C(2\ U)^2=2\ CU^2$; and a signal driving power consumption of the circuit in FIG. 7 is $P1=0.5*CU^2+0.5*CU^2=CU^2$.

Thus it can be seen that under the same signal driving effect, the signal generating circuit of the embodiment of the present application can reduce the signal driving power consumption of the active pen, and reduce the direct current voltage, thereby reducing the difficulty of generating a direct current high voltage.

Figure 9:
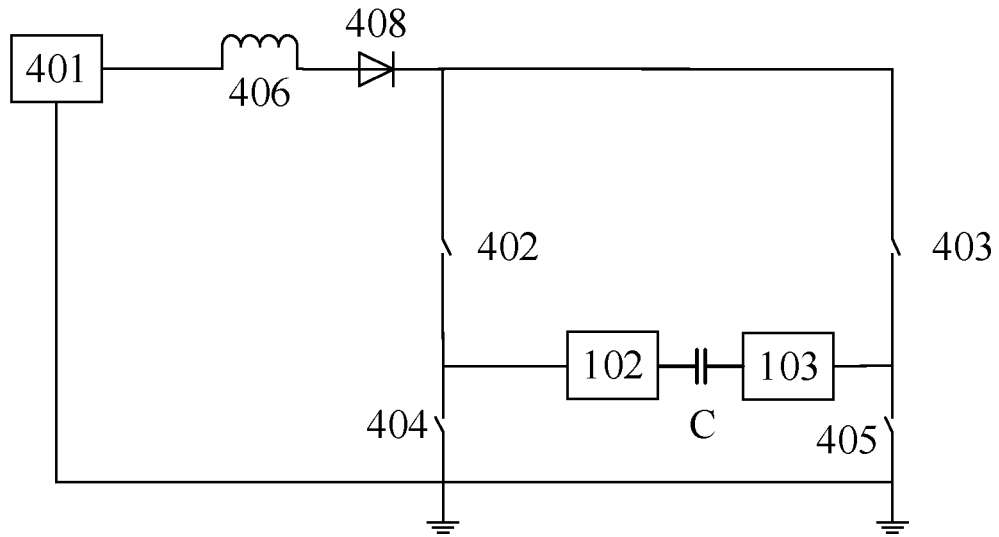
FIG. 9 shows another circuit configuration diagram of a signal generating circuit of an embodiment of the present application.

FIG. 9 is a circuit schematic diagram of a signal generating circuit of another embodiment of the present application. As shown in FIG. 9, the signal generating circuit includes a signal source 401, a first switch 402, a first switch 402, a second switch 403, a third switch 404, a fourth switch 405, a first inductance 406, and a first diode 408. One end of the first inductance 406 is connected to a positive electrode of the signal source 401, and the other end of the first inductance 406 is connected to an anode of the first diode 408; a cathode of the first diode 408 is connected to a pen tip 102 through the first switch 402; the cathode of the first diode 408 is connected to a pen casing 103 through the second switch 403; a negative electrode of the signal source 401 is connected to the pen tip 102 and the first switch 402 respectively through the third switch 404; and the negative electrode of the signal source 401 is connected to the pen casing 103 and the second switch 403 respectively through the fourth switch 405. The first inductance 406 and the first diode 408 can serve as a boosting unit, which is configured to enable a positive voltage or a negative voltage generated between the pen tip 102 and the pen casing 103 to be greater than a voltage supplied by the power source unit by a control of the first switch 402~the fourth switch 405. The first switch 402 is controlled by a first control signal SW1, the second switch 403 is controlled by a second control signal SW2, the third switch 404 is controlled by a third control signal SW3, and the fourth switch 405 is controlled by a fourth control signal SW4.

Figure 10:
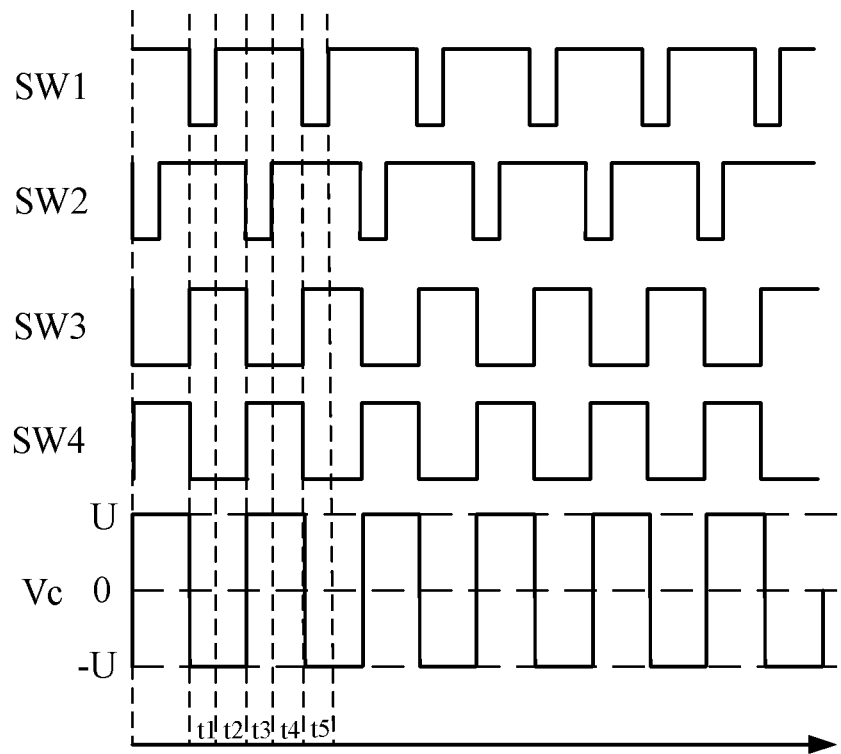
FIG. 10 shows another operation waveform diagram of a signal generating circuit of an embodiment of the present application.

The working principle of the signal generating circuit of FIG. 9 will be described in detail below in combination with a timing diagram of FIG. 10. As shown in FIG. 10, the states of the first control signal SW1~the fourth control signal SW4 are mainly divided into four phases. In a first phase, the first control signal SW1 is at a high level, the third control signal SW3 is at a high level, the second control signal SW2 can be at a high level as shown in FIG. 10 or a low level, and the fourth control signal SW4 is at a low level, that is a t2 phase in FIG. 10; at the moment, the first switch 402 is closed, the third switch 404 is closed, the second switch 403 is closed, the fourth switch 405 is open, and the signal source 401 charges the first inductance 406. In a second phase, the first control signal SW1 is at a high level, the fourth control signal SW4 is at a high level, the third control signal SW3 is at a low level, and the second control signal SW2 is at a low level, that is a t3 phase in FIG. 10; at the moment, the first switch 402 is closed, the fourth switch 405 is closed, the third switch 404 is open, the second switch 403 is open, a voltage of the pen casing 103 is zero, the signal source 401 no longer charges the first inductance 406, and an energy of the first inductance 406 begins to be transferred to a capacitor C between the pen tip 102 and the pen casing 103; when the energy of the inductance is zero, a voltage on the pen tip 102 reaches a maximum value, i.e., a voltage Vc generated between the pen tip 102 and the pen casing 103 reaches a forward maximum value, and the voltage Vc can be maintained to be the maximum value using a cut-off reverse voltage characteristic of the first diode 408. In a third phase, the second control signal SW2 is at a high level, the fourth control signal SW4 is at a high level, the first control signal SW1 can be at a high level as shown in FIG. 10 or a low level, and the third control signal SW3 is at a low level, that is a t4 phase in FIG. 10; at the moment, the first switch 402 is closed, the second switch 403 is closed, the third switch 404 is open, the fourth switch 405 is closed, the signal source 401 begins to charge the first inductance 406, and the voltage Vc continues to be U. In a fourth phase, the second control signal SW2 is at a high level, the third control signal SW3 is at a high level, the fourth control signal SW4 is at a low level, and the first control signal SW1 is at a low level, that is a t5 phase in FIG. 10; at the moment, the second switch 403 is closed, the third switch 404 is closed, the first switch 402 is open, the fourth switch 405 is open, a voltage of the pen tip 102 is zero, the signal source 401 no longer charges the first inductance 406, and an energy of the first inductance 406 begins to be transferred to a capacitor C between the pen tip 102 and the pen casing 103; when the energy of the inductance is zero, a voltage on the pen casing 103 reaches a maximum value, i.e., a voltage Vc generated between the pen tip 102 and the pen casing 103 reaches a reverse maximum value, and the voltage Vc can be maintained to be the reverse maximum value, such as −U, using a cut-off reverse voltage characteristic of the first diode 408. The process from the first phase to the fourth phase can then be repeated.

It should be understood that, in this embodiment, since the first inductance 406 is a shared inductance, as for the charging phase of the first inductance 406, whether to specifically charge by a branch of the first switch 402 and the third switch 404, or charge by a branch of the second switch 403 and the fourth switch 405, or charge by the two branches simultaneously, it is not specifically limited herein. In other words, as for the aforesaid first phase, the first inductance 406 can also be charged by closing the second switch 403 and the fourth switch 405.

Optionally, in an actual circuit, the circuit needs to be reset when it is powered up; in other words, the voltage of the pen tip needs to be cleared before the aforesaid first phase. That is a t1 phase in FIG. 10. Specifically, the first control signal SW1 is at a low level, the third control signal SW3 is at a high level, the second control signal SW2 can be at a high level, and the fourth control signal SW4 can be at a low level; in other words, the first switch 402 is open, the second switch 403 is closed, the third switch 404 is closed, and the fourth switch 405 is open, such that the voltage of the pen tip 102 is zero.

The aforesaid inductance and diode are both shared; however, in an embodiment of the present application, an inductance can be shared while diodes are separated. Two specific embodiments in this scenario will be described below.

Figure 11:
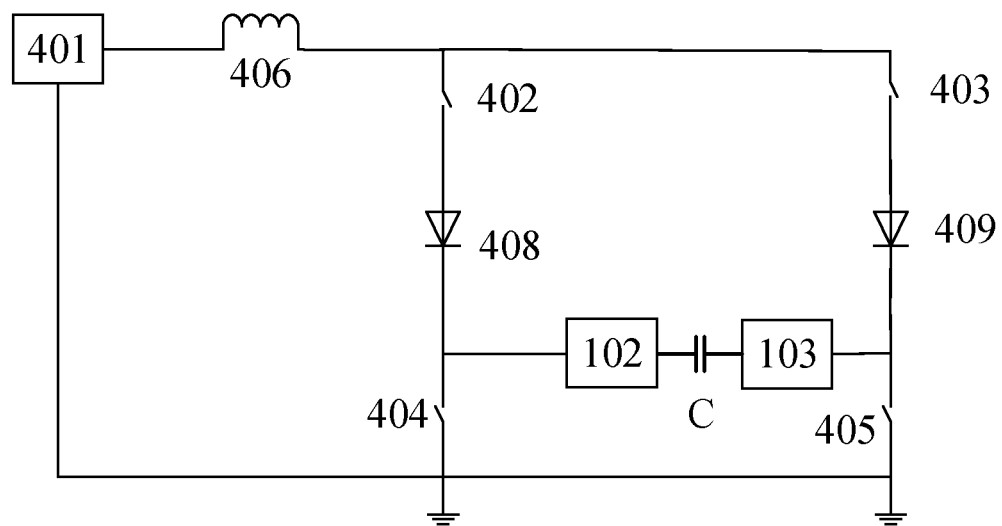
FIG. 11 shows another circuit configuration diagram of a signal generating circuit of an embodiment of the present application.

Optionally, as shown in FIG. 11, a signal generating circuit includes a signal source 401, a first switch 402~a fourth switch 405, a first inductance 406, a first diode 408, and a second diode 409. One end of the first inductance 406 is connected to a positive electrode of the signal source 401; the other end of the first inductance 406 is connected to an anode of the first diode 408 through the first switch 402; the other end of the first inductance 406 is connected to an anode of the second diode 409 through the second switch 403; a negative electrode of the signal source 401 is connected to a pen tip 102 and a cathode of the first diode 408 respectively through the third switch 404, and the negative electrode of the signal source 401 is connected to a pen casing 103 and a cathode of the second diode 409 respectively through the fourth switch 405.

Figure 12:
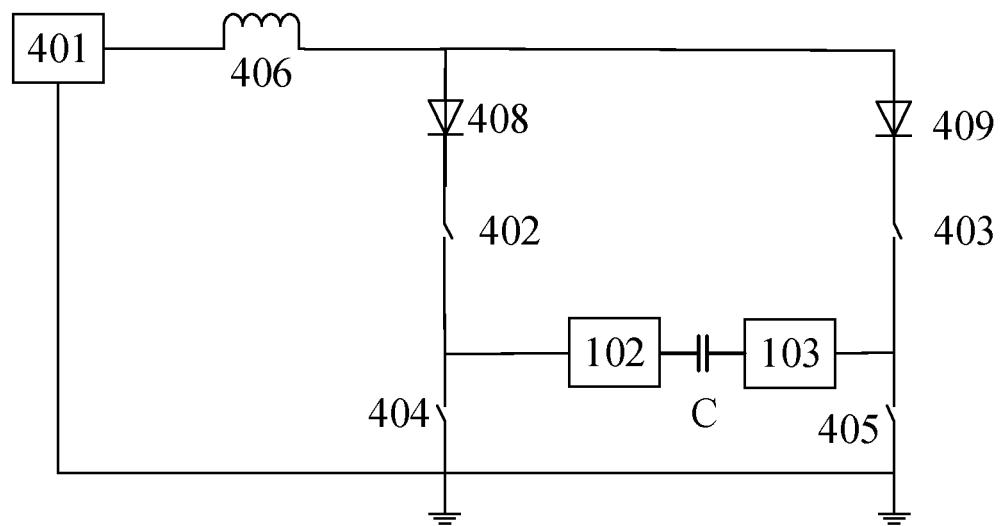
FIG. 12 shows another circuit configuration diagram of a signal generating circuit of an embodiment of the present application.

Optionally, as shown in FIG. 12, a signal generating circuit includes a signal source 401, a first switch 402~a fourth switch 405, a first inductance 406, a first diode 408, and a second diode 409. One end of the inductance 406 is connected to a positive electrode of the signal source 401, and the other end of the first inductance 406 is connected to an anode of the first diode 408 and an anode of the second diode 409 respectively; a cathode of the first diode 408 is connected to the third switch 404 and a pen tip 102 respectively through the first switch 402; a cathode of the second diode 409 is connected to the fourth switch 405 and a pen casing 103 through the second switch 403; a negative electrode of the signal source 401 is connected to the pen tip 102 through the third switch 404; and the negative electrode of the signal source 401 is connected to the pen casing 103 through the fourth switch 405.

For the working principles of the signal generating circuits of the above two embodiments, reference may be made to the description of the signal generating circuit of FIG. 9, and for brevity, it will not be repeated redundantly herein.

Figure 13:
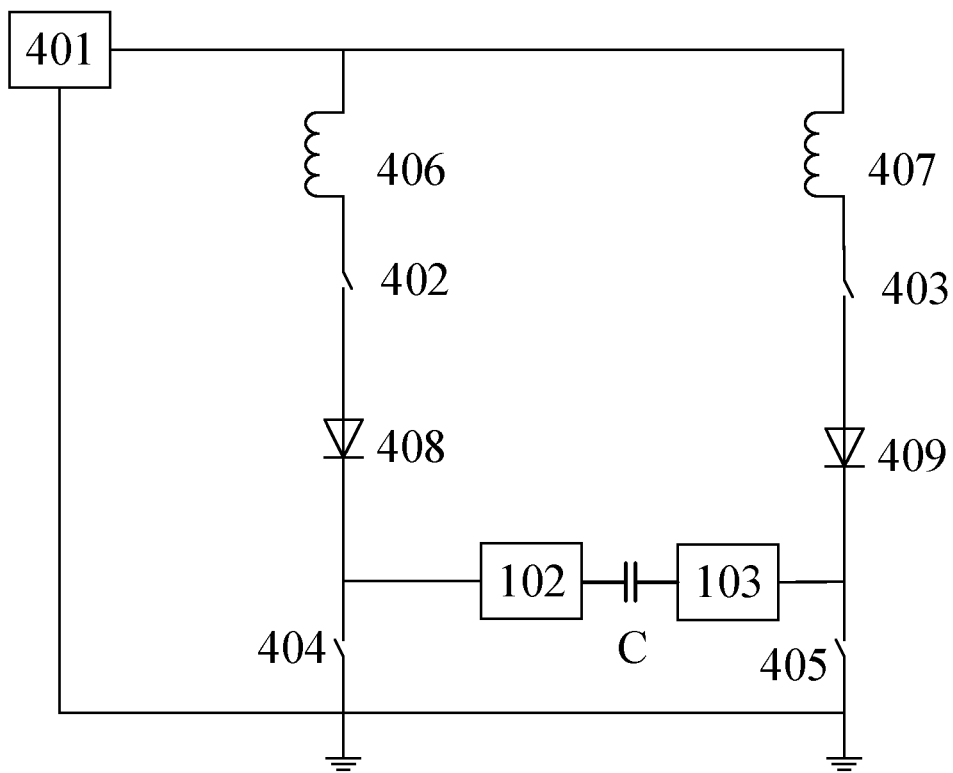
FIG. 13 shows another circuit configuration diagram of a signal generating circuit of an embodiment of the present application.

FIG. 13 is a circuit schematic diagram of a signal generating circuit of another embodiment of the present application. As shown in FIG. 13, the signal generating circuit includes a signal source 401, a first switch 402~a fourth switch 405, a first inductance 406, a second inductance 407, a first diode 408, and a second diode 409. Both one end of the first inductance 406 and one end of the second inductance 407 are connected to a positive electrode of the signal source 401; the other end of the first inductance 406 is connected to an anode of the first diode 408 through the first switch 402; the other end of the second inductance 407 is connected to an anode of the second diode 409 through the second switch 403; a negative electrode of the signal source 401 is connected to a pen tip 102 and a cathode of the first diode 408 respectively through the third switch 404, and the negative electrode of the signal source 401 is connected to a pen casing 103 and a cathode of the second diode 409 respectively through the fourth switch 405. The first inductance 406 and the first diode 408, as well as the second inductance 407 and the second diode 409 can serve as two sets of boosting units respectively, which are configured to enable a positive voltage or a negative voltage generated between the pen tip 102 and the pen casing 103 to be greater than a voltage supplied by the power source unit by a control of the first switch 402~the fourth switch 405. The first switch 402 is controlled by a first control signal SW1, the second switch 403 is controlled by a second control signal SW2, the switch 404 is controlled by a third control signal SW3, and the fourth switch 405 is controlled by a fourth control signal SW4.

Figure 14:
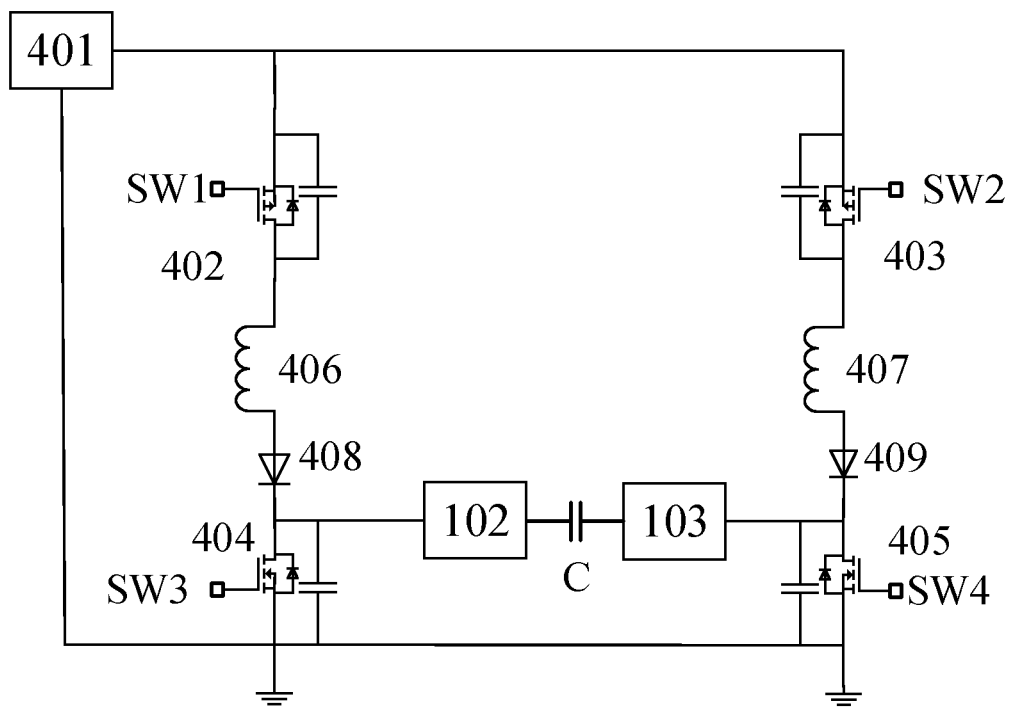
FIG. 14 shows another circuit configuration diagram of a signal generating circuit of an embodiment of the present application.

FIG. 14 is a circuit schematic diagram of a signal generating circuit of another embodiment of the present application. As shown in FIG. 14, the signal generating circuit includes a signal source 401, a first switch 402~a fourth switch 405, a first inductance 406, a second inductance 407, a first diode 408, and a second diode 409. A positive electrode of the signal source 401 is connected to one end of the first inductance 406 through the first switch 402; the positive electrode of the signal source 401 is connected to one end of the second inductance 407 through the second switch 403; the other end of the first inductance 406 is connected to an anode of the first diode 408; the other end of the second inductance 407 is connected to an anode of the second diode 409; a negative electrode of the signal source 401 is connected to a pen tip 102 and a cathode of the first diode 408 respectively through the third switch 404, and the negative electrode of the signal source 401 is connected to a pen casing 103 and a cathode of the second diode 409 respectively through the fourth switch 405. The first inductance 406 and the first diode 408, as well as the second inductance 407 and the second diode 409 can serve as two sets of boosting units respectively, which are configured to enable the positive voltage or the negative voltage generated between the pen tip 102 and the pen casing 103 to be greater than a voltage supplied by the power source unit by a control of the first switch 402~the fourth switch 405. The first switch 402 is controlled by a first control signal SW1, the second switch 403 is controlled by a second control signal SW2, the third switch 404 is controlled by a third control signal SW3, and the fourth switch 405 is controlled by a fourth control signal SW4.

For the working timing diagrams of the above signal generating circuits shown in FIG. 13 and FIG. 14, reference may be made to FIG. 10. The working principles of the signal generating circuits are as follows. In a t1 phase, the first switch 402 is open, the third switch 404 is closed, and a voltage of the pen tip 102 is zero. In a t2 phase, the first switch 402 and the third switch 404 are closed, and the signal source 401 charges the first inductance 406. In a t3 phase, the first switch 402 is closed, the third switch 404 is open, the fourth switch 405 is closed, and a voltage of the pen casing 103 is zero; at the moment, the signal source 401 no longer charges the first inductance 406, and an energy of the first inductance 406 begins to be transferred to a parasitic capacitor of the third switch 404 and a capacitor C between the pen tip and the pen casing; when the energy of the first inductance 406 is zero, a voltage on the pen tip 102 reaches a maximum value, i.e., a voltage Vc generated between the pen tip 102 and the pen casing 103 reaches a forward maximum value, and the voltage Vc is maintained to be the maximum value U using a cut-off reverse voltage characteristic of the first diode 408. In a t4 phase, the third switch 404 is open, the fourth switch 405 is closed, a voltage of the pen casing 103 is zero, the voltage Vc is maintained to be U; meanwhile, the second switch 403 and the fourth switch 405 are closed, and the signal source 401 charges the second inductance 407. In a t5 phase, the third switch 404 is closed, and a voltage of the pen tip 102 is zero; meanwhile, the second switch 403 is closed, the fourth switch 405 is open, the signal source 401 no longer charges the second inductance 407, and an energy of the second inductance 407 begins to be transferred to a parasitic capacitor of the fourth switch 405 and the capacitor C between the pen tip 102 and the pen casing 103; when the energy of the second inductance 407 is zero, a voltage on the pen casing 103 reaches a maximum value, i.e., a voltage Vc generated between the pen tip 102 and the pen casing 103 reaches a reverse maximum value, and the voltage Vc is maintained to be the maximum value −U using cut-off a reverse voltage characteristic of the second diode 409. The aforesaid t2~t5 phases are repeated.

Figure 15:
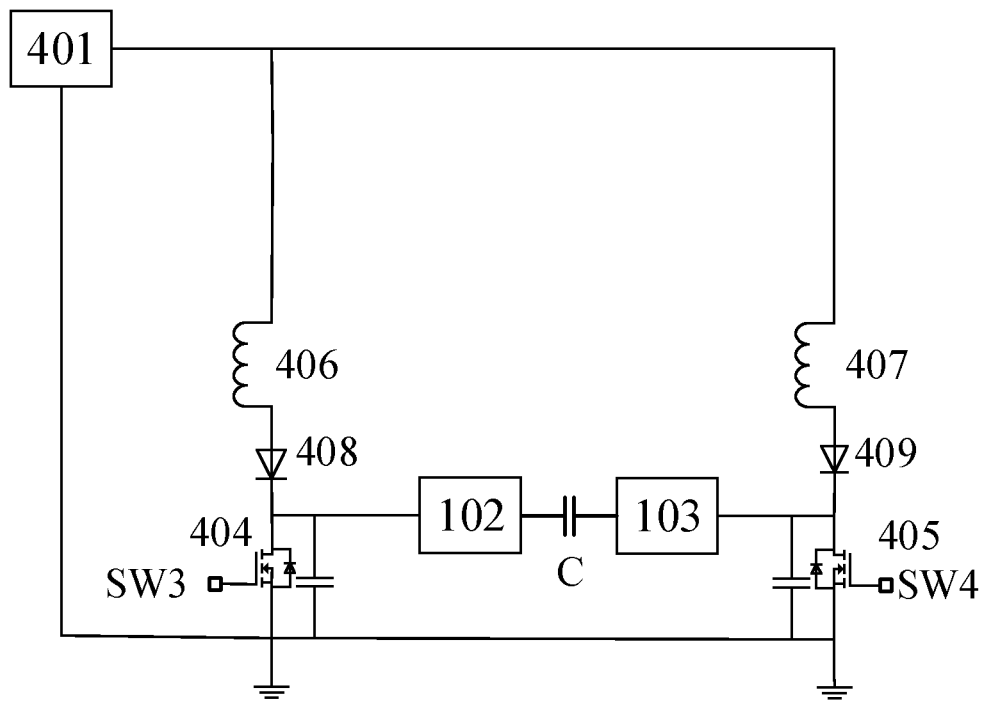
FIG. 15 shows another circuit configuration diagram of a signal generating circuit of an embodiment of the present application.
Figure 16:
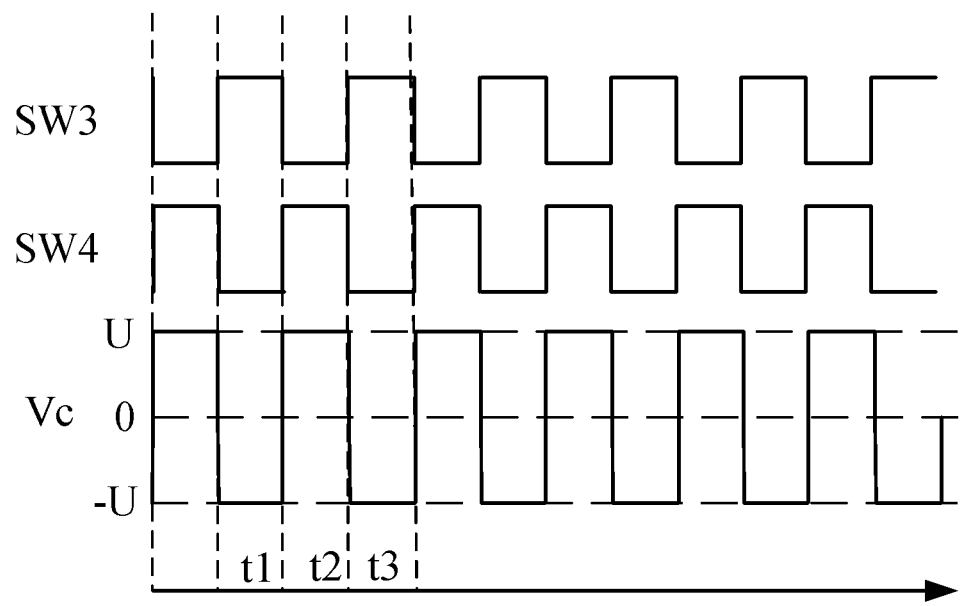
FIG. 16 shows another operation waveform diagram of a signal generating circuit of an embodiment of the present application.

FIG. 15 is a circuit schematic diagram of a signal generating circuit of another embodiment of the present application. As shown in FIG. 15, the signal generating circuit includes a signal source 401, a third switch 404, a fourth switch 405, a first inductance 406, a second inductance 407, a first diode 408, and a second diode 409. A positive electrode of the signal source 401 is connected to one end of the first inductance 406; the positive electrode of the signal source 401 is connected to one end of the second inductance 407; the other end of the first inductance 406 is connected to an anode of the first diode 408; the other end of the second inductance 407 is connected to an anode of the second diode 409; a negative electrode of the signal source 401 is connected to a cathode of the first diode 408 and a pen tip 102 respectively through the third switch 404, and the negative electrode of the signal source 401 is connected to a cathode of the second diode 409 and a pen casing 103 respectively through the fourth switch 405. The signal generating circuit of FIG. 15 can be regarded as that the first switch 402 and the second switch 403 in each of the signal generating circuits of FIG. 13 and FIG. 14 are always closed. In other words, the first control signal SW1 and the second control signal SW2 for controlling the first switch 402 and the second switch 403 are at a high level at each phase, and a voltage between the pen tip 102 and the pen casing 103 is controlled by the third control signal SW3 and the fourth control signal SW4 for controlling the third switch 404 and the fourth switch 405. A waveform diagram of the signal generating circuit is shown in FIG. 16, and the working principle is as follows. In a t1 phase, the third switch 404 is closed, the fourth switch 405 is open, a voltage of the pen tip 102 is zero, the signal source 401 is grounded through the first inductance 406, the first diode 408 and the third switch 404, and the first inductance 406 begins to store energy. In a t2 phase, the fourth switch 405 is closed, and a voltage of the pen casing 103 is zero; the third switch 404 is open, and the fourth switch 405 is closed, at the moment, the signal source 401 no longer charges the first inductance 406, and an energy of the inductance 406 begins to be transferred to a parasitic capacitor of the third switch 404 and a capacitor C between the pen tip and the pen casing; when the energy of the first inductance 406 is zero, a voltage on the pen tip 102 reaches a maximum value, i.e., a voltage Vc generated between the pen tip 102 and the pen casing 103 reaches a forward maximum value, and the voltage Vc is maintained to be the maximum value U using a cut-off reverse voltage characteristic of the first diode 408. During this period, the fourth switch 405 is closed, the voltage of the pen tip 102 is zero, the signal source 401 is grounded through the second inductance 407, the second diode 409 and the fourth switch 405, and the second inductance 407 begins to store energy. In a t3 phase (same as the t1), the third switch 404 is closed, the fourth switch 405 is open, a voltage of the pen tip 102 is zero, the signal source 401 is grounded through the first inductance 406, the first diode 408 and the third switch 404, and the first inductance 406 begins to store energy; during this period, since the fourth switch 405 is open, the signal source 401 no longer charges the second inductance 407, and an energy of the second inductance 407 begins to be transferred to a parasitic capacitor of the fourth switch 405 and the capacitor C between the pen tip and the pen casing; when the energy of the second inductance 407 is zero, a voltage on the pen tip 102 reaches a maximum value, i.e., a voltage Vc generated between the pen tip 102 and the pen casing 103 reaches a reverse maximum value; and the voltage Vc is maintained to be the maximum value −U using a cut-off reverse voltage characteristic of the second diode 409.

The signal generating circuit of FIG. 15 uses two switches less than the signal generating circuits of FIG. 9 to FIG. 14, which can reduce a material cost.

It is understood by those skilled in the art that an inductance stores energy through a current, and a capacitor stores energy through a voltage. In other words, the greater the current on the inductance is, the greater the energy is, and the greater the energy on the capacitor is, the greater the voltage is. The calculating formula of the current on the inductance is i=∫(U/L)dt; it can be seen that the current on the inductance is time dependent; theoretically, the longer the time is, the greater the current is, the greater the energy is, thus the greater the voltage discharged to the capacitor is. Therefore, by adjusting a time duty ratio of inductance charging and discharging, the voltage charged on the capacitor between the pen tip and the pen casing can be raised above the voltage supplied by the power source; in other words, in the solution, the voltage can be boosted to a high voltage through a low voltage supplied by the power source, thus a better signal driving effect can be obtained, and the design is simple and easy to be implemented.

Optionally, in the aforesaid various boost signal generating circuits, the control unit further includes a fifth switch 410 and a sixth switch 411; the fifth switch 410 is connected in parallel with the third switch 404 and the first diode 408; the sixth switch 411 is connected in parallel with the fourth switch 405 and the second diode 409; the fifth switch 410 and the third switch 404 are open or closed simultaneously; and the sixth switch 411 and the fourth switch 405 are open or closed simultaneously.

Circuit schematic diagrams of signal generating circuits of another two embodiments of the present application will be described below in combination with FIG. 17 and FIG. 18. Compared with FIG. 14, a signal generating circuit of FIG. 17 further includes a fifth switch 410 and a sixth switch 411, where a negative electrode of a signal source 401 is connected to an anode of a first diode 408 through the fifth switch 410; the negative electrode of the signal source 401 is connected to an anode of a second diode 409 through the sixth switch 411; the fifth switch 410 and the third switch 404 are open or closed simultaneously; and the sixth switch 411 and the fourth switch 405 are open or closed simultaneously. The first switch 402 is controlled by a first control signal SW1, the second switch 403 is controlled by a second control signal SW2, the third switch 404 and the fifth switch 410 are controlled by a third control signal SW3, and the fourth switch 405 and the sixth switch 411 are controlled by a fourth control signal SW4. The waveform diagram is shown in FIG. 10, and the working principle is specifically as follows. In a t1 phase, the first switch 402 is open, the third switch 404 and the fifth switch 410 are closed, and a voltage of a pen tip 102 is zero. In a t2 phase, the first switch 402, the third switch 404 and the fifth switch 410 are closed, and the signal source 401 charges a first inductance 406. In a t3 phase, the first switch 402 is closed, the third switch 404 and the fifth switch 410 are open, the fourth switch 405 and the sixth switch 411 are closed, and a voltage of a pen casing 103 is zero; at the moment, the signal source 401 no longer charges the first inductance 406, and an energy of the first inductance 406 begins to be transferred to a parasitic capacitor of the third switch 404 and the fifth switch 410 as well as a capacitor C between the pen tip 102 and the pen casing 103; when the energy of the first inductance 406 is zero, a voltage on the pen tip 102 reaches a maximum value, i.e., a voltage Vc generated between the pen tip 102 and the pen casing 103 reaches a forward maximum value, and the voltage Vc is maintained to be the maximum value U using a cut-off reverse voltage characteristic of the first diode 408. In a t4 phase, the third switch 404 and the fifth switch 410 are open, the fourth switch 405 and the sixth switch 411 are closed, a voltage of the pen casing 103 is zero, and the voltage on the pen tip 102 maintains to be U; meanwhile, the second switch 403, the fourth switch 405 and the sixth switch 411 are closed, and the signal source 401 charges a second inductance 407. In a t5 phase, the third switch 404 and the fifth switch 410 are closed, and a voltage of the pen tip 102 is zero; meanwhile, the fourth switch 405 and the sixth switch 411 are open, the signal source 401 no longer charges the second inductance 407, and an energy of the second inductance 407 begins to be transferred to a parasitic capacitor of the fourth switch 405 and the sixth switch 411 as well as the capacitor C between the pen tip 102 and the pen casing 103; when the energy of the second inductance 407 is zero, a voltage on the pen casing 103 reaches a maximum value, i.e., a voltage Vc generated between the pen tip 102 and the pen casing 103 reaches a reverse maximum value, and the voltage Vc is maintained to be the maximum value −U using a cut-off reverse voltage characteristic of the second diode 409.

Figure 18:
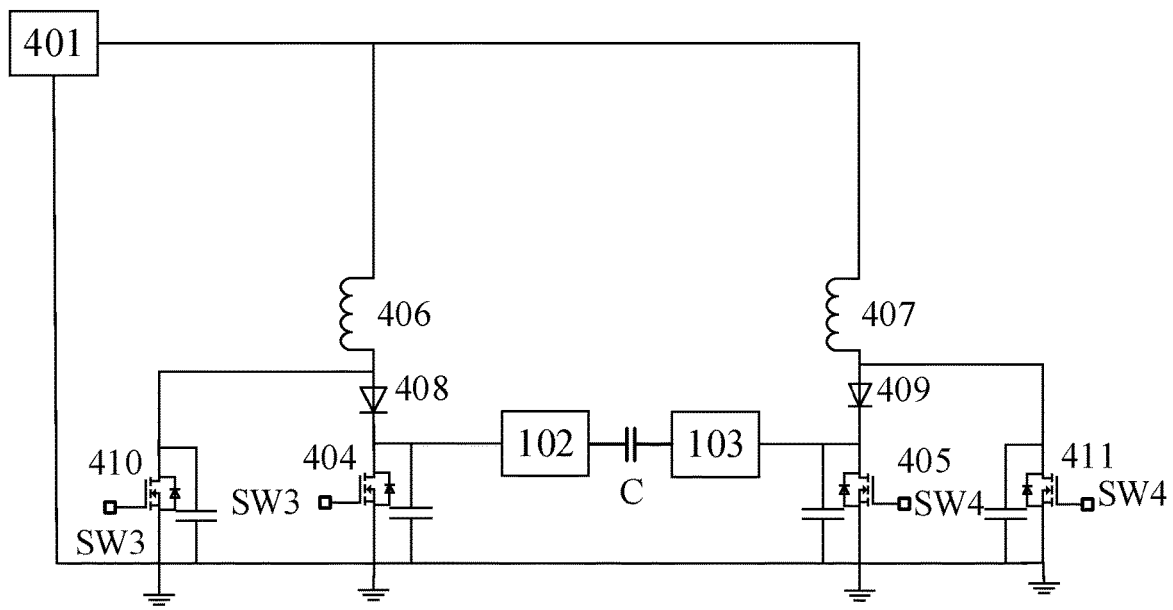
FIG. 18 shows another circuit configuration diagram of a signal generating circuit of an embodiment of the present application.

Compared with FIG. 15, a signal generating circuit of FIG. 18 further includes a fifth switch 410 and a sixth switch 411, where a negative electrode of a signal source 401 is connected to an anode of a first diode 408 through the fifth switch 410; the negative electrode of the signal source 401 is connected to an anode of a second diode 409 through the sixth switch 411; the fifth switch 410 and the third switch 404 are open or closed simultaneously; and the sixth switch 411 and the fourth switch 405 are open or closed simultaneously. The third switch 404 and the fifth switch 410 are controlled by a third control signal SW3, and the fourth switch 405 and the sixth switch 411 are controlled by a fourth control signal SW4. The waveform diagram is shown in FIG. 16, and the working principle is specifically as follows. In a t1 phase, the third switch 404 and the fifth switch 410 are closed, a voltage of the pen tip 102 is zero, the signal source 401 is grounded through a first inductance 406 and the fifth switch 410, and the first inductance 406 begins to store energy. In a t2 phase, the fourth switch 405 and the sixth switch 411 are closed, a voltage of the pen casing 103 is zero, and the third switch 404 and the fifth switch 410 are open; at the moment, the signal source 401 no longer charges the first inductance 406, and an energy of the first inductance 406 begins to be transferred to a parasitic capacitor of the third switch 404 and the fifth switch 410 as well as a capacitor C between the pen tip 102 and the pen casing 103; when the energy of the first inductance 406 is zero, a voltage on the pen tip 102 reaches a maximum value, i.e., a voltage Vc generated between the pen tip 102 and the pen casing 103 reaches a forward maximum value, and the voltage Vc is maintained to be the maximum value U using a cut-off reverse voltage characteristic of the first diode 408. During this period, the fourth switch 405 and the sixth switch 411 are closed, the voltage of the pen tip 102 is zero, the signal source 401 is grounded through a second inductance 407 and the sixth switch 411, and the second inductance 407 begins to store energy. In a t3 phase, the third switch 404 and the fifth switch 410 are closed, a voltage of the pen tip is zero, the signal source 401 is grounded through the first inductance 406 and the fifth switch 410, and the first inductance 406 begins to store energy; during this period, the fourth switch 405 and the sixth switch 411 are open; at the moment, the signal source 401 no longer charges the second inductance 407, and an energy of the second inductance 407 begins to be transferred to a parasitic capacitor of the fourth switch 405 and the sixth switch 411 as well as the capacitor C between the pen tip 102 and the pen casing 103; when the energy of the second inductance 407 is zero, a voltage on the pen casing 103 reaches a maximum value, i.e., a voltage Vc generated between the pen tip 102 and the pen casing 103 reaches a reverse maximum value; and the voltage Vc is maintained to be the maximum value −U using a cut-off reverse voltage characteristic of the second diode 409.

Figure 17:
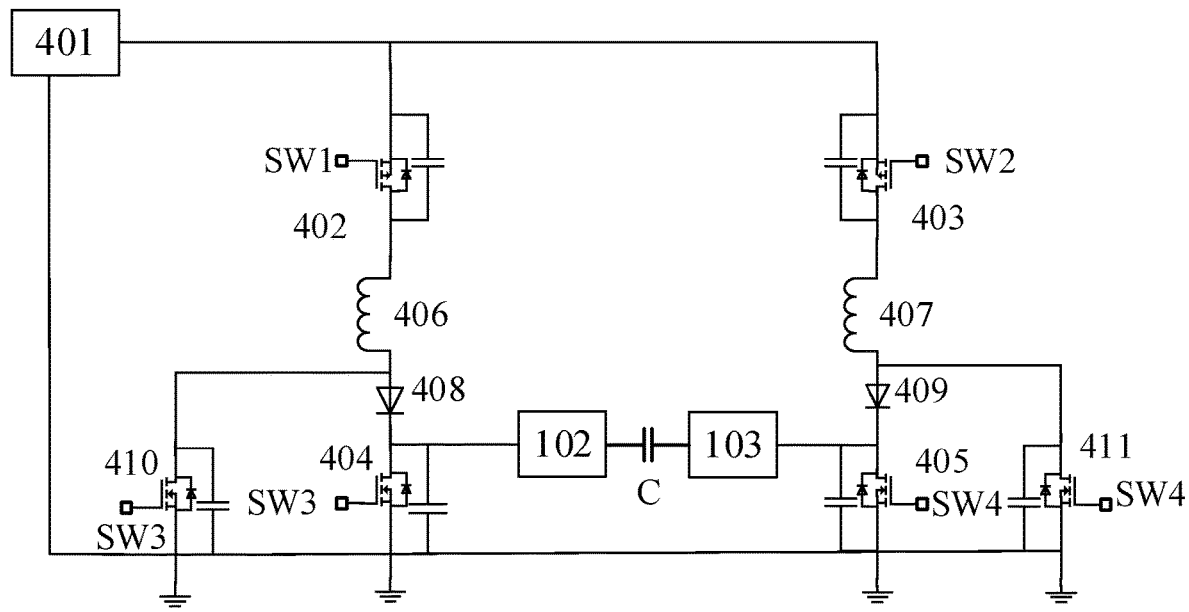
FIG. 17 shows another circuit configuration diagram of a signal generating circuit of an embodiment of the present application.

It should be understood that, the manners shown in FIG. 17 and FIG. 18 that the fifth switch 410 and the sixth switch 411 are respectively connected in parallel with the third switch 404 and the fourth switch 405 can be used in the aforesaid various boost signal generating circuits, and for brevity, it will not be exemplified here. In this way, when the signal source needs to charge the inductance, the signal source can directly charge the first inductance 406 or the second inductance 407 through a bypass of the fifth switch 410 or a sixth switch 411 directly without passing through the diode, which can improve the efficiency when the inductance stores the energy.

It should be understood that, in the signal generating circuits, each of the aforesaid switches can be composed of a metal oxide semiconductor (metal oxide semiconductor, MOS) tube, each MOS tube has its own parasitic capacitor, and in practical applications, the smaller the parasitic capacitor is, the better performance the MOS tube has. Specifically, the first switch 402 and the second switch 403 can be composed of a positive (Positive) PMOS tube, and the third switch 404, the fourth switch 405, the fifth switch 410, and the sixth switch 411 can be composed of a negative (Negative) NMOS tube.

Optionally, an embodiment of the present application further provides an active pen, where the active pen includes the signal generating circuits in the aforesaid various embodiments; when the active pen is in contact with a touch screen of a terminal device, the signal generating circuit supplies a signal driving voltage to a pen tip of the active pen; the active pen further has a driving circuit and a processor such as a Micro Control Unit (Micro Control Unit, MCU), where each switch of the signal generating circuit can be driven by the processor through the driving circuit, thereby controlling the signal generating circuit to supply the signal driving voltage to the pen tip of the active pen.

Figure 19:
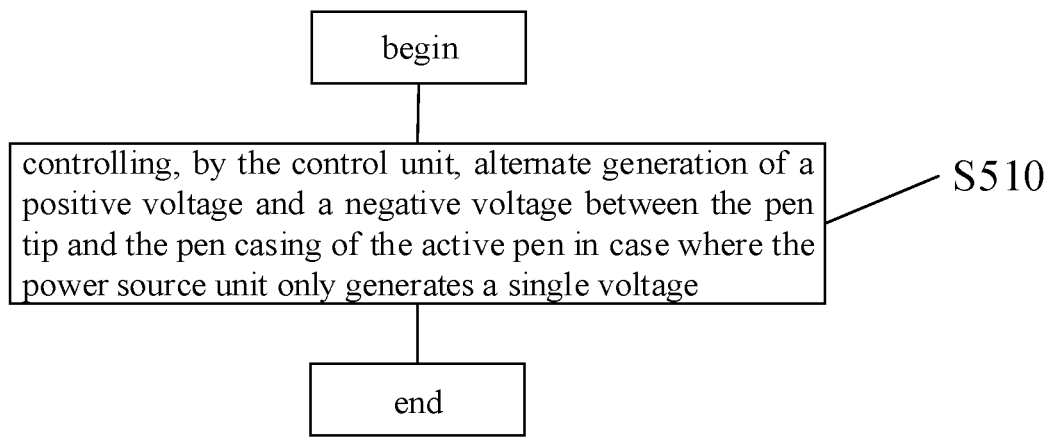
FIG. 19 shows a schematic block diagram of a signal driving method of an embodiment of the present application.

FIG. 19 shows a schematic block diagram of a signal driving method 500 of an embodiment of the present application. The signal driving method 500 is configured for the communication between an active pen and a terminal device; a signal generating circuit of the active pen is configured to perform the signal driving method; the signal generating circuit includes a power source unit and a control unit; the power source unit is connected to the active pen through the control unit; and in case where the power source unit only generates a single voltage, the method 500 includes:

S510: controlling, by the control unit, alternate generation of a positive voltage and a negative voltage between the pen tip and the pen casing of the active pen.

In the signal driving method of the embodiment of the present application, in case where the power source unit only generates a single voltage, i.e., a positive voltage or a negative voltage, the positive voltage and the negative voltage can be alternately generated between the pen tip and the pen casing of the active pen; and in case where a signal driving effect is kept unchanged, an output voltage of the power source unit can be reduced, so that a signal driving power consumption of the active pen can be reduced.

The signal driving method according to the embodiment of the present application can correspond to each unit/module in the signal generating circuits of the embodiments of the present application; besides, the corresponding flow of the method can be implemented by each unit/module in the apparatuses shown in FIG. 6 to FIG. 18; and for brevity, it is not repeated redundantly herein.

It should be understood that "one embodiment" or "an embodiment" mentioned throughout the specification means that a particular feature, structure, or characteristic in connection with the embodiment is included in at least one embodiment of the disclosure. Therefore, "in one embodiment" or "in an embodiment" appeared throughout the specification does not necessarily mean a same embodiment. Further, the particular features, structures or characteristics may be combined in any suitable manner in one or more embodiments.

It should be understood that, in various embodiments of the present disclosure, values of sequence numbers of the above-mentioned various processes do not mean an order of execution which should be determined based upon functionalities and internal logics thereof, rather than setting any limitation to implementation of the embodiment of the present disclosure.

It should be understood that in the embodiments of the present disclosure, "B corresponding to A" means that B is associated with A, and B can be determined according to A. However, it should also be understood that determining B according to A does not mean that B is determined merely according to A, and that B can also be determined according to A and/or other information.

In addition, the terms "system" and "network" are always used interchangeably herein. It should be understood that the term "and/or" herein merely describes association relations between associated objects, and expresses three relations, for example, A and/or B may express three conditions, namely A exists separately, A and B exist simultaneously and B exists separately. In addition, the character "/" in the present disclosure generally represents an "or" relationship of two related objects before and after the character.

Those of ordinary skill in the art may be aware that, units and circuits of the examples described in the embodiments disclosed in this paper may be implemented by electronic hardware, computer software, or a combination of the two. Whether these functions are executed in hardware or software mode depends on the specific applications and design constraint conditions of the technical solution. Those skilled may implement the described functions by using different methods for each specific application, but this implementation should not be considered to be beyond the scope of the present application.

In several embodiments provided by the present application, it should be understood that the disclosed circuits, branches and units may be realized in other manner. For example, the branches described above are merely exemplary, e.g., the division of the units is merely a logic function division, other division manners may exist in practical implementation, for example, a plurality of units or components may be combined or integrated to one branch, or some features may be omitted or not implemented.

If the integrated unit is implemented in the form of the software functional unit and is sold or used as an independent product, it may be stored in a computer readable storage medium. Based on such understanding, the technical solution of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The preceding storage mediums includes various mediums that can store program codes, such as, a U disk, a removable hard disk, a read-only memory (Read-Only Memory, ROM), a random access memory (Random Access Memory, RAM), a magnetic disk, an optical disk, or the like.

Described above are the specific embodiments of the present application only, but the protection scope of the present application is not limited to this, those skilled who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A signal generating circuit of an active pen, wherein the signal generating circuit comprises a power source and a control circuit, the power source is configured to supply a signal driving voltage to the active pen, and the control circuit is configured to control alternate generation of a positive voltage and a negative voltage between a pen tip and a pen casing of the active pen in case where the power source only generates a single voltage;

wherein the signal generating circuit comprises a boosting circuit, the boosting circuit is configured to, by a control of the control circuit, enable the positive voltage or the negative voltage generated between the pen tip and the pen casing to be greater than a voltage supplied by the power source;

wherein the boosting unit comprises an inductance group and a diode group; in a charging phase, the power source unit charges the inductance group under the control of the control unit in a discharging phase, under the control of the control unit, an energy of the inductance group charged in the charging phase is transferred to a capacitor between the pen tip and the pen casing; and the diode group is configured to maintain a voltage of the capacitor charged in the discharging phase;

wherein the inductance group comprises a first inductance; the control circuit comprises a first switch, a second switch, a third switch and a fourth switch;

in the first phase, the first switch and the third switch are closed, and the power source charges the first inductance;

in the second phase, the first switch and the fourth switch are closed, the second switch and the third switch are open, and an energy of the first inductance stored in the first phase is transferred to the capacitor between the pen tip and the pen casing;

in the third phase, the second switch and the fourth switch are closed, and the power source charges the first inductance; and in the fourth phase, the first switch and the fourth switch are open, the second switch and the third switch are closed, and an energy of the first inductance stored in the third phase is transferred to the capacitor between the pen tip and the pen casing.

2. The signal generating circuit according to claim 1, wherein the diode group comprises a first diode; one end of the first inductance is connected to a positive electrode of the power source, and another end of the first inductance is connected to an anode of the first diode; a cathode of the first diode is connected to the pen tip through the first switch; the cathode of the first diode is connected to the pen casing through the second switch; a negative electrode of the power source is connected to the pen tip and the first switch respectively through the third switch; and the negative electrode of the power source is connected to the pen casing and the second switch respectively through the fourth switch.

3. The signal generating circuit according to claim 1, wherein the diode group comprises a first diode and a second diode; one end of the first inductance is connected to a positive electrode of the power source ; another end of the first inductance is connected to an anode of the first diode through the first switch; the another end of the first inductance is connected to an anode of the second diode through the second switch; a negative electrode of the power source is connected to the pen tip and a cathode of the first diode respectively through the third switch; and the negative electrode of the power source is connected to the pen casing and a cathode of the second diode respectively through the fourth switch.

4. The signal generating circuit according to claim 3, wherein the control circuit further comprises a fifth switch and a sixth switch; the fifth switch is connected in parallel with the third switch and the first diode; the sixth switch is connected in parallel with the fourth switch and the second diode; the fifth switch and the third switch are open or closed simultaneously; and the sixth switch and the fourth switch are open or closed simultaneously.

5. The signal generating circuit according to claim 1, wherein the first switch and the second switch are PMOS tubes, and the third switch and the fourth switch are NMOS tubes.

6. An active pen comprising a signal generating circuit, wherein the signal generating circuit comprises signal generating circuit according to claim 1.

7. The signal generating circuit according to claim 1, wherein the control unit comprises a first switch group and a second switch group; the power source unit is connected to the active pen through the first switch group and the second switch group respectively; and a positive voltage and a negative voltage are alternately generated between the pen tip and the pen casing when the first switch group and the second switch group are alternately closed.

8. The signal generating circuit according to claim 7, wherein the first switch group comprises a first switch and a fourth switch; the second switch group comprises a second switch and a third switch; a positive electrode of the power source unit is connected to the pen tip through the first switch; the positive electrode of the power source unit is connected to the pen casing through the second switch; a negative electrode of the power source unit is connected to the pen tip through the third switch; and the negative electrode of the power source unit is connected to the pen casing through the fourth switch.

9. A signal generating circuit of an active pen, wherein the signal generating circuit comprises a power source and a control circuit, the power source is configured to supply a signal driving voltage to the active pen, and the control circuit is configured to control alternate generation of a positive voltage and a negative voltage between a pen tip and a pen casing of the active pen in case where the power source only generates a single voltage;

wherein the signal generating circuit comprises a boosting circuit, the boosting circuit is configured to, by a control of the control circuit, enable the positive voltage or the negative voltage generated between the pen tip and the pen casing to be greater than a voltage supplied by the power source;

wherein the boosting unit comprises an inductance group and a diode group; in a charging phase, the power source unit charges the inductance group under the control of the control unit; in a discharging phase, under the control of the control unit, an energy of the inductance group charged in the charging phase is transferred to a capacitor between the pen tip and the pen casing; and the diode group is configured to maintain a voltage of the capacitor charged in the discharging phase;

wherein the inductance group comprises a first inductance and a second inductance; the diode group comprises a first diode and a second diode; the first inductance is connected in series with the first diode; the second inductance is connected in series with the second diode; the control unit comprises a first switch, a second switch, a third switch and a fourth switch; the charging phase is divided into a first phase and a third phase; and the discharging phase is divided into a second phase and a fourth phase;

in the first phase, the first switch and the third switch are closed, and the power source unit charges the first inductance;

in the second phase, the first switch and the fourth switch are closed, the third switch is open, and an energy of the first inductance stored in the first phase is transferred to the capacitor between the pen tip and the pen casing;

in the third phase, the second switch and the fourth switch are closed, and the power source unit charges the second inductance; and in the fourth phase, the fourth switch is open, the second switch and the third switch are closed, and an energy of the second inductance stored in the third phase is transferred to the capacitor between the pen tip and the pen casing.

10. The signal generating circuit according to claim 9, wherein both one end of the first inductance and one end of the second inductance are connected to a positive electrode of the power source; another end of the first inductance is connected to an anode of the first diode through the first switch; another end of the second inductance is connected to an anode of the second diode through the second switch; a negative electrode of the power source is connected to the pen tip and a cathode of the first diode respectively through the third switch; and the negative electrode of the power source is connected to the pen casing and a cathode of the second diode respectively through the fourth switch.

11. The signal generating circuit according to claim 9, wherein a positive electrode of the power source is connected to one end of the first inductance through the first switch; the positive electrode of the power source is connected to one end of the second inductance through the second switch; another end of the first inductance is connected to an anode of the first diode; another end of the second inductance is connected to an anode of the second diode; a negative electrode of the power source is connected to a cathode of the first diode and the pen tip respectively through the third switch; and the negative electrode of the power source is connected to a cathode of the second diode and the pen casing respectively through the fourth switch.

12. An active pen comprising a signal generating circuit, wherein the signal generating circuit comprises signal generating circuit according to claim 9.

13. A signal generating circuit of an active pen, wherein the signal generating circuit comprises a power source and a control circuit, the power source is configured to supply a signal driving voltage to the active pen, and the control circuit is configured to control alternate generation of a positive voltage and a negative voltage between a pen tip and a pen casing of the active pen in case where the power source only generates a single voltage;

wherein the signal generating circuit comprises a boosting circuit, the boosting circuit is configured to, by a control of the control circuit, enable the positive voltage or the negative voltage generated between the pen tip and the pen casing to be greater than a voltage supplied by the power source;

wherein the boosting unit comprises an inductance group and a diode group; in a charging phase, the power source unit charges the inductance group under the control of the control unit; in a discharging phase, under the control of the control unit, an energy of the inductance group charged in the charging phase is transferred to a capacitor between the pen tip and the pen casing; and the diode group is configured to maintain a voltage of the capacitor charged in the discharging phase;

wherein the inductance group comprises a first inductance and a second inductance; the diode group comprises a first diode and a second diode; the control unit comprises a third switch and a fourth switch; a positive electrode of the power source unit is connected to one end of the first inductance; the positive electrode of the power source is connected to one end of the second inductance; another end of the first inductance is connected to an anode of the first diode; another end of the second inductance is connected to an anode of the second diode; a negative electrode of the power source unit is connected to a cathode of the first diode and the pen tip respectively through the third switch; the negative electrode of the power source unit is connected to a cathode of the second diode and the pen casing respectively through the fourth switch; the charging phase comprises a first phase and a third phase; and the discharging phase comprises a second phase and a fourth phase;

in the first phase, the third switch is closed, the fourth switch is open, and the power source unit charges the first inductance;

in the second phase, the third switch is open, the fourth switch is closed, and an energy of the first inductance charged in the first phase is transferred to the capacitor between the pen tip and the pen casing;

in the third phase, the third switch is open, the fourth switch is closed, and the power source unit charges the second inductance; and in the fourth phase, the third switch is closed, the fourth switch is open, and an energy of the second inductance charged in the third phase is transferred to the capacitor between the pen tip and the pen casing.

14. An active pen comprising a signal generating circuit, wherein the signal generating circuit comprises signal generating circuit according to claim 13.

\* \* \* \* \*